United States Patent
Song et al.

(10) Patent No.: US 8,234,232 B2
(45) Date of Patent: Jul. 31, 2012

(54) WORD-SPACING CORRECTION SYSTEM AND METHOD

(75) Inventors: Hee Jun Song, Namyangju-si (KR); Young Hee Park, Seoul (KR); Hyun Sik Shim, Yongin-si (KR); Jong Gyu Ham, Seoul (KR); Hark Soo Kim, Chuncheon-si (KR); Jong Hwan Kim, Chuncheon-si (KR); Yeong Kil Song, Chuncheon-si (KR)

(73) Assignees: Samsung Electronics Co., Ltd., Samsung-Ro, Yeontong-Gu, Suwon-Si, Gyeonggi-Do (KR); Knu-Industry Cooperation Foundation, Hyoja 2-Dong, Chuncheon-Si, Gangwon-Do (KR)

( * ) Notice: Subject to any disclaimer, the term of this patent is extended or adjusted under 35 U.S.C. 154(b) by 623 days.

(21) Appl. No.: 12/419,594

(22) Filed: Apr. 7, 2009

(65) Prior Publication Data

US 2009/0254501 A1    Oct. 8, 2009

(30) Foreign Application Priority Data

Apr. 7, 2008    (KR) .......................... 10-2008-0032348

(51) Int. Cl.
*G06F 17/00* (2006.01)
*G06F 15/18* (2006.01)
*G06N 5/02* (2006.01)

(52) U.S. Cl. ................................ 706/47; 706/12; 706/45

(58) Field of Classification Search .................. None
See application file for complete search history.

(56) References Cited

U.S. PATENT DOCUMENTS

2005/0060150 A1*    3/2005    Li et al. ...................... 704/240

OTHER PUBLICATIONS

Kang, Mi-young; Choi, Sung-woo. "A Hybrid Approach to Automatic Word-spacing in Korean." Innovations in Applied Artifical Intelligence. 3029 (2004): 284-294.*
Chunyu Kit, Zhiming Xu, and Jonathan J. Webster. 2003. Integrating ngram model and case-based learning for Chinese word segmentation. In Proceedings of the second SIGHAN workshop on Chinese language processing—vol. 17 (SIGHAN '03), vol. 17. Association for Computational Linguistics, Stroudsburg, PA, USA, 160-163.*
Wallach, Hanna M. "Conditional Random Fields: An Introduction." University of Pennsylvania CIS Technical Report MS-CIS-04-21 (2004).*
Lee, Seung-Wook; Rim, Hae-Chang; Park, So-Young; , "A New Approach for Korean Word Spacing Incorporating Confidence Value of User's Input," Advanced Language Processing and Web Information Technology, 2007. ALPIT 2007. Sixth International Conference on , vol., no., pp. 92-97, Aug. 22-24, 2007.*

(Continued)

*Primary Examiner* — Kakali Chaki
*Assistant Examiner* — Daniel Pellett
(74) *Attorney, Agent, or Firm* — Cha & Reiter, LLC

(57) ABSTRACT

A word-spacing correction system and method are provided to automatically recognize and correct errors in the spacing of word inputs in an electronic device with relatively low computing power. In a learning process, probability information about each feature is created from a corpus of correct words, and then error correction rules are created by applying the probability information to a corpus of incorrect words from which all spaces between words of the corpus of correct words are removed. In an applying process, word-spacing in a user's input sentence is corrected by applying the probability information and the error correction rules to the user's input sentence.

18 Claims, 12 Drawing Sheets

OTHER PUBLICATIONS

Kang, S.S., Woo C.W.: Automatic Segmentation of Words Using Syllable Bigram Statistics. Proceedings of 6th Natural Language Processing Pacific Rim Symposium (2001) 729-732.*

Do-Gil Lee; Hae-Chang Rim; Dongsuk Yook; , "Automatic Word Spacing Using Probabilistic Models Based on Character n-grams," Intelligent Systems, IEEE, vol. 22, No. 1, pp. 28-35, Jan.-Feb. 2007.*

Park, Seong-Bae; Tae, Yoon-Shik; Park, Se-Young. "Self-Organizing n-gram Model for Automatic Word Spacing," Proceedings of the 21st International Conference on Computational Linguistics and 44th Annual Meeting of the ACL, pp. 633-640, Jul. 2006.*

Fürnkranz, Johannes; Flach, Peter A. "ROC 'n' Rule Learning—Towards a Better Understanding of Covering Algorithms," Machine Learning 58.1 (2005): 39-77.*

Leopold, Edda; Kindermann, Jörg. "Text Categorization with Support Vector Machines. How to Represent Texts in Input Space?" Machine Learning 46.1 (2002): 423-444.*

* cited by examiner

FIG. 2A

| FEATURE | PROBABILITY | |
|---|---|---|
| | SPACING PROBABILITY $[P(O\|F)]$ | NO-SPACING $[P(1\|F)]$ |
| ⋮ | ⋮ | ⋮ |
| ^^아버지 | 0.6 | 0.4 |
| ^아버지가 | 0.6 | 0.4 |
| 아버지가방 | 0.3 | 0.7 |
| 버지가방$ | 0.2 | 0.8 |
| ⋮ | ⋮ | ⋮ |

FIG. 2B

| FEATURE | WORD-SPACING INFORMATION | CONFIDENCE SCORE |
|---|---|---|
| ⋮ | ⋮ | ⋮ |
| ^^아버지 | 0 | 1.5 |
| ^아버지가 | 0 | 2.3 |
| 아버지가방 | 0 | 3.2 |
| 버지가방에 | 1 | 2.6 |
| 버지가방 | 1 | 3.8 |
| 지가방 | 0 | 1.7 |
| 가방 | 0 | 1.1 |
| ⋮ | ⋮ | ⋮ |

| FEATURE | WORD-SPACING INFORMATION |
|---|---|
| ⋮ | ⋮ |
| 버지가방에 | 1 |
| 지가방에들 | 0 |
| 가방에들어 | 1 |
| ⋮ | ⋮ |

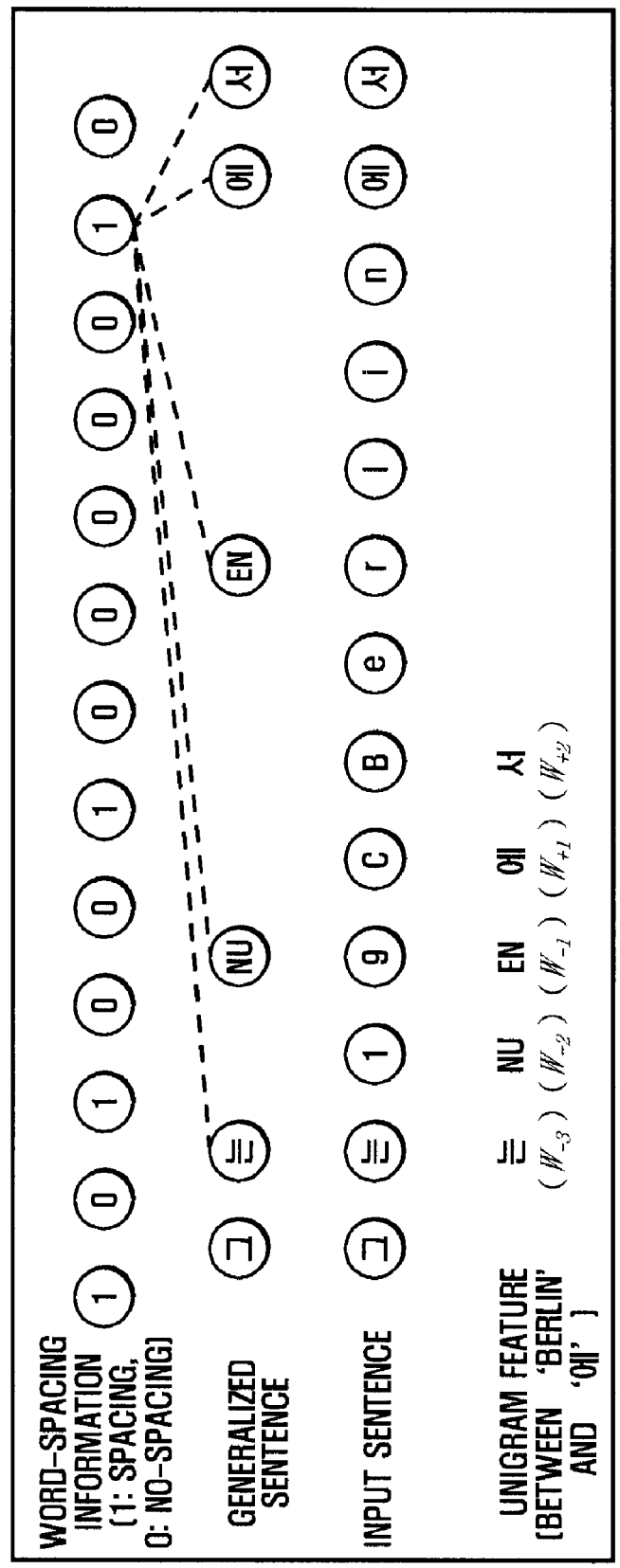

WORD-SPACING CORRECTION SYSTEM AND METHOD

CLAIM OF PRIORITY

This application claims priority from an application entitled "WORD-SPACING CORRECTION SYSTEM AND METHOD" filed in the Korean Intellectual Property Office on Apr. 7, 2008 and assigned Serial No. 10-2008-0032348, the contents of which are incorporated herein by reference in its entirety.

BACKGROUND OF THE INVENTION

1. Field of the Invention

The present invention relates generally to word-spacing correction technology. More particularly, the present invention relates to a system and a method for automatically recognizing and correcting errors in spacing of word inputs in an electronic device with relatively lower computing power.

2. Description of the Related Art

A mobile device, which includes a broad range of devices and may also be referred to as a portable device, a handheld device, a portable communication terminal, etc., is typically a pocket-sized computing device typically having a display screen with touch input and/or a miniature keyboard (often referred to as a keypad). Many different types of mobile devices are being used today as follows: communication devices, mobile computers, handheld game consoles, media recorders, media players/displayers, and personal navigation devices.

Because of space limitations which are based in part on consumer preference, such mobile devices inherently use inherently a smaller sized input unit with a smaller number of keys than a traditional keyboard. Therefore, a mobile device is not user-friendly in that it is typically rather difficult to input letters. Additionally, for a convenient input, a user often disregards spacing words when inputting a sentence. However, the appearance can be considered quite unprofessional in a business setting, where a note sent from a small pocket-sized device could be read by a client or employer using a desktop computer, and not realizing why the appearance of the message is sloppy.

In an attempt to solve the problem regarding spacing, some approaches have been proposed in the art to automatically space words. One particular approach is based on an analytical technique. To space words, this analytical approach uses heuristic information such as longest matching, shortest matching, morpheme analysis rules, and word-spacing error patterns through vocabulary information. The analytical-based approach, however, needs a great variety of linguistic materials for morpheme analysis and is not cost-effective in constructing and managing linguistic materials. Furthermore, this approach has another drawback of a very low accuracy rate for unregistered words.

Another approach is based on a statistical technique. This statistical approach corrects word-spacing errors by learning, from a corpus of words, the probability of spacing or not between adjacent two syllables. This approach automatically obtains syllable information from a primitive corpus of words, so it may reduce construction costs of materials and also may enhance accuracy for unregistered words. This statistical approach, however, needs a large-sized learning data and a great memory space to obtain reliable probability information.

A widely used way to acquire probability information is an n-gram model using, as learning data, n syllables around a target point for word-spacing. Advantageously, this n-gram model approach can obtain more reliable probability at a higher-sized n-gram, but this may unfavorably require much stronger computing power. It is therefore difficult to directly apply an n-gram model to mobile device with lower computing power. Specifically, it is impossible for mobile devices to use probability information of 2-grams or more.

SUMMARY OF THE INVENTION

Accordingly, the present invention provides word-spacing correction system and method which are available for electronic devices with relatively lower computing power such as mobile devices.

Additionally, the present invention provides word-spacing correction system and method which can reduce the amount of memory capacity used/required and have a higher accuracy by utilizing only the advantageous portions of an analytical approach and a statistical approach.

According to an exemplary aspect of the present invention, a word-spacing correction method comprises a learning process which includes creating probability information about each feature from a corpus of correct words, and creating error correction rules by applying the probability information to a corpus of incorrect words from which all spaces between words of the corpus of correct words are removed; and an applying process which includes correcting word-spacing in a user's input sentence by applying the probability information and the error correction rules to the user's input sentence.

According to another exemplary aspect of the present invention, a word-spacing correction system comprises a learning unit for creating probability information about each feature from a corpus of correct words, and for creating error correction rules by applying the probability information to a corpus of incorrect words from which all spaces between words of the corpus of correct words are removed; and an applying unit for correcting word-spacing in a user's input sentence by applying the probability information and the error correction rules to the user's input sentence.

BRIEF DESCRIPTION OF THE DRAWINGS

FIG. 2A is a view illustrating the probability information database in accordance with an exemplary embodiment of the present invention.

FIG. 2B is a view illustrating the error correction rule database in accordance with an exemplary embodiment of the present invention.

FIG. 5 is a view illustrating a process of generalizing special characters in accordance with an exemplary embodiment of the present invention.

DETAILED DESCRIPTION

Exemplary, non-limiting embodiments of the present invention will now be described more fully with reference to the accompanying drawings. This invention may, however, as defined by the appended claims, can be embodied in many different forms in addition to the examples discussed herein. Moreover, the present invention should not be construed as limited to the exemplary embodiments set forth herein. Rather, the disclosed exemplary embodiments are provided so that this disclosure will be thorough and complete in understanding so as to convey fully the scope of the invention to those skilled in the art. The principles and features of this invention may be employed in varied and numerous exemplary embodiments without departing from the scope of the invention.

Furthermore, well known or widely used techniques, elements, structures, and processes may not be described or illustrated in detail to avoid obscuring appreciation of the present invention by a person of ordinary skill in the art.

Figure 1:
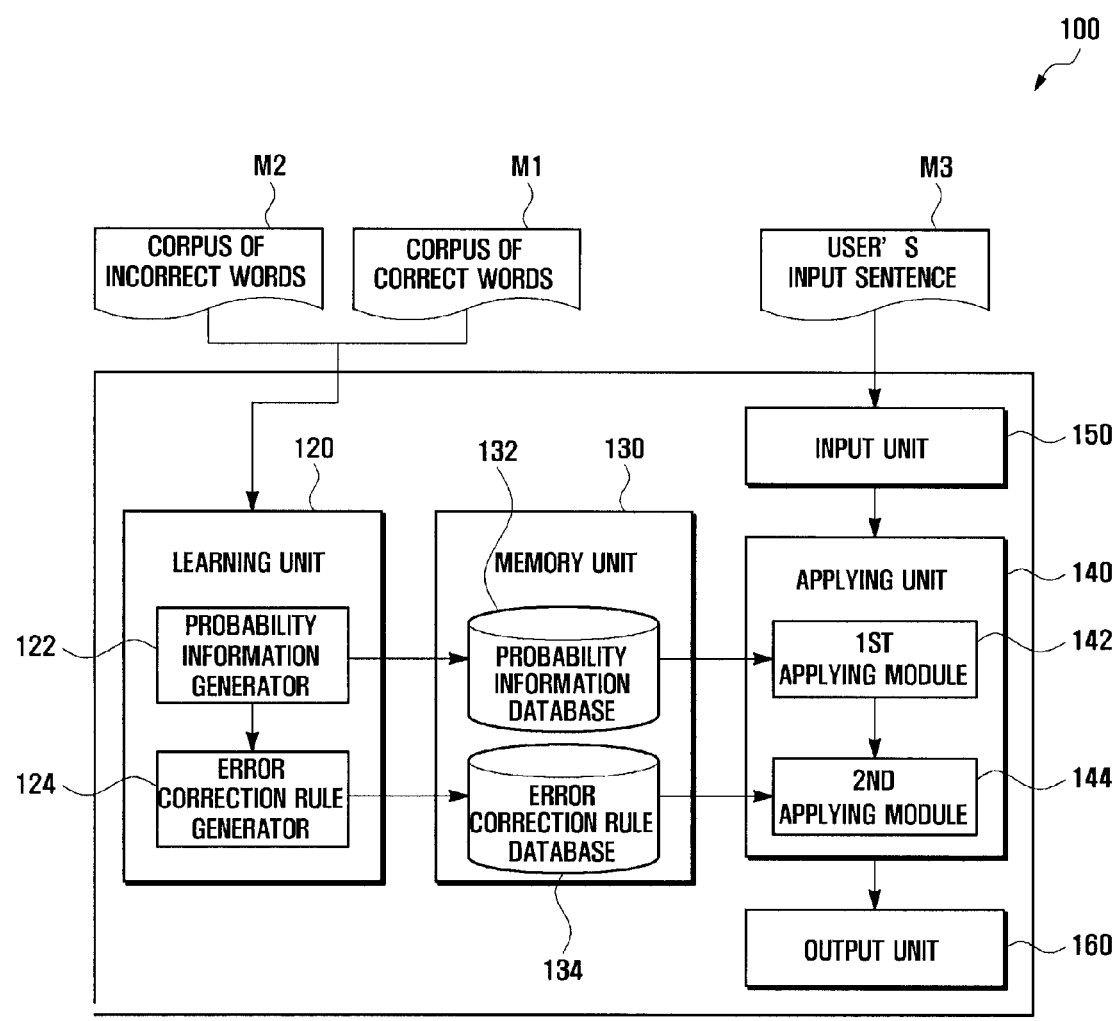
FIG. 1 is a block diagram illustrating a word-spacing correction system in accordance with an exemplary embodiment of the present invention.

FIG. 1 shows, in a block diagram, a word-spacing correction system 100 in accordance with an exemplary embodiment of the present invention.

Referring first to FIG. 1, the word-spacing correction system 100 includes a learning unit 120, a memory unit 130, an applying unit 140, an input unit 150, and an output unit 160. This word-spacing correction system 100 acquires information (e.g., probability information and an error correction rule) via a learning process executed in the learning unit 120, and stores such information from the learning process in the memory unit 130. Additionally, this system 100 applies the stored information to a user's input sentence M3 in the applying unit 140, and thereby corrects a space between words of a user's input sentence M3.

Specifically, the learning unit 120 creates probability information and an error correction rule and stores them in the memory unit 130. To execute the above functions, the learning unit 120 includes a probability information generator 122 and an error correction rule generator 124.

The probability information generator 122 extracts features from a corpus of correct words M1. Preferably, the probability information generator 122 in this exemplary embodiment uses a 1-gram model (also referred to as a unigram model) to extract features. Considering the relatively low computing power of a mobile device (including but in now way limited to a mobile phone, Personal Digital Assistant (PDA), handheld device, this 1-gram model can reduce a load of CPU and reduce an amount of a memory capacity used and/or required.

Additionally, the probability information generator 122 creates probability information by applying the extracted features and a probability model to a corpus of incorrect words M2 from which all spaces between words of a corpus of correct words M1 are removed. Preferably, the probability information generator 122 in this exemplary embodiment uses a Conditional Random Fields (CRFs) probability model to create probability information, A CRFs probability model is an undirected graphical model for calculating a conditional probability of a specified output node when a variety of input nodes are given. This CRFs probability model follows the form of a first-order Markov model when output nodes are linked to each other in the form of a linear chain. The advantages of a CRFs probability model are that it can relieve an independent assumption known as a shortcoming of a Hidden Markov Model (HMM) and can overcome a label bias problem known as a shortcoming of a Maximum Entropy Markov Model (MEMM). For these reasons, a CRFs probability model is advantageous in the field of a native language process and also preferred in this exemplary embodiment of the invention. A CRFs probability model is, however, exemplary only and not to be considered as a limitation of the present invention. Other probability models, including but in no way limited to HMM and MEMM may be alternatively employed for the present invention.

Probability information created by the probability information generator 122 is stored in a probability information database 132 of the memory unit 130. As will be discussed later, the applying unit 140 can easily use the probability information.

Still referring to FIG. 1 the error correction rule generator 124 produces a corpus of first-spaced words by applying probability information to a corpus of incorrect words M2. Additionally, the error correction rule generator 124 produces an error correction rule by using errors found in a corpus of first-spaced words. Specifically, the error correction rule generator 124 extracts parts required for correction (i.e., error parts) from a corpus of first-spaced words and then creates candidate rules for an error correction rule. Candidate rules refer to rules in which several cases of word-spacing are applied to error parts. An error correction rule is selected from among candidate rules.

Furthermore, the error correction rule generator 124 calculates a confidence score of each candidate rule by comparing candidate rules with a corpus of correct words M1. A confidence score is based on, for example, both the number of cases where each candidate rule is correctly applied and the number of cases where each candidate rule is incorrectly applied. The error correction rule generator 124 selects an error correction rule on the basis of a confidence score of each candidate rule.

An error correction rule created by the error correction unit generator 124 is stored in an error correction rule database 134 (FIG. 1) of the memory unit 130. As will be discussed later, the applying unit 140 can easily use easily an error correction rule.

Terminologies such as probability information, candidate rules, a confidence score and an error correction rule will be discussed in more detail when a word-spacing method is described herein below.

The applying unit 140 receives a user's input sentence M3 through the input unit 150 of the electronic device. Additionally, the applying unit 140 corrects a space between words of a user's input sentence M3 by applying probability information and an error correction rule that are created in the learning unit 120. To execute the above functions, the applying unit 140 preferably includes a first applying module 142 and a second applying module 144.

Still referring to FIG. 1, the first applying module 142 applies probability information to a user's input sentence M3, and thus creates a first word-spaced sentence. For this, the first applying module 142 extracts features through a unigram from a user's input sentence M3 and, by using the probability information database 132, finds probability values corresponding to the extracted features. Then, the first applying module 142 determines whether to space words by using probability values and creates a first word-spaced sentence that a user's input sentence M3 is corrected.

The second applying module 144 applies an error correction rule to a first word-spaced sentence and thus creates a second word-spaced sentence. For example, the second applying module 144 extracts error parts from a first word-spaced sentence and applies, to error parts, an error correction rule selected from the error correction rule database 134. Here, the second applying module 144 selects only one error correction rule with the highest confidence score among several error correction rules.

The memory unit 130 may be comprised of a program region and a data region. A program region stores application programs necessary for controlling the operation of the word-spacing correction system 100, and also stores an operating system (OS). A data region stores data created while such programs are executed. Particularly, a data region stores the probability information database 132 and the error correction rule database 134.

The probability information database 132 stores probability information created by the probability information generator 122.

FIG. 2A is a view that illustrates the probability information database 132 in accordance with an exemplary embodiment of the present invention. Referring now to FIG. 2A, the probability information database 132 includes a feature field used to record features and a probability value field used to record probability information corresponding to features. Also, the probability value field is used to record a probability, denoted by P(0|F), that a specific feature is written continuously, and a probability, denoted by P(1|F), that a specific feature is written separately. The fields of the probability information database 132 will be described later.

The error correction rule database 134 (FIG. 1) stores error correction rules created by the error correction rule generator 124. FIG. 2B is a view that illustrates the error correction rule database 134 in accordance with an exemplary embodiment of the present invention. Referring to FIG. 2B, the error correction rule database 134 includes a feature field used to record features selected by error correction rules, a word-spacing information field used to record whether each feature is written separately, and a confidence score field used to record a confidence score of each feature. These fields of the error correction rule database 134 will be described later.

Returning now to FIG. 1, the input unit 150 includes a number of alphanumeric keys and function keys arranged for efficient data entry into the system 100. On receipt of a user's key selection, the input unit 150 creates a key selection signal and sends it to the applying unit 140. For example, the input unit 150 receives a user's input sentence M3 and conveys it to the first applying module 142 in the applying unit 140. The input unit 150 may employ a keypad, a touchpad, a wheel key, a touch screen and/or any other pointing devices or input devices.

The output unit 160 outputs information visibly or audibly. For example, the output unit 160 receives a second word-spaced sentence from the second applying module 144 and outputs it in a visible or audible form. The output unit 160 may employ a well-known display device such as a liquid crystal display (LCD) and a speaker.

Herein above, the word-spacing correction system 100 according to an exemplary embodiment of the present invention is described. This system 100 may be available for relatively smaller computing devices, such as mobile devices, with lower computing power.

Herein below, a word-spacing correction method according to an exemplary embodiment of the present invention will now be described.

The word-spacing correction method of the present invention may be classified into a learning process for acquiring probability information and error correction rules, and an applying process for correcting a space between words of a user's input sentence M3 by using probability information and error correction rules.

First, the learning process will be described herein below.

Figure 3:
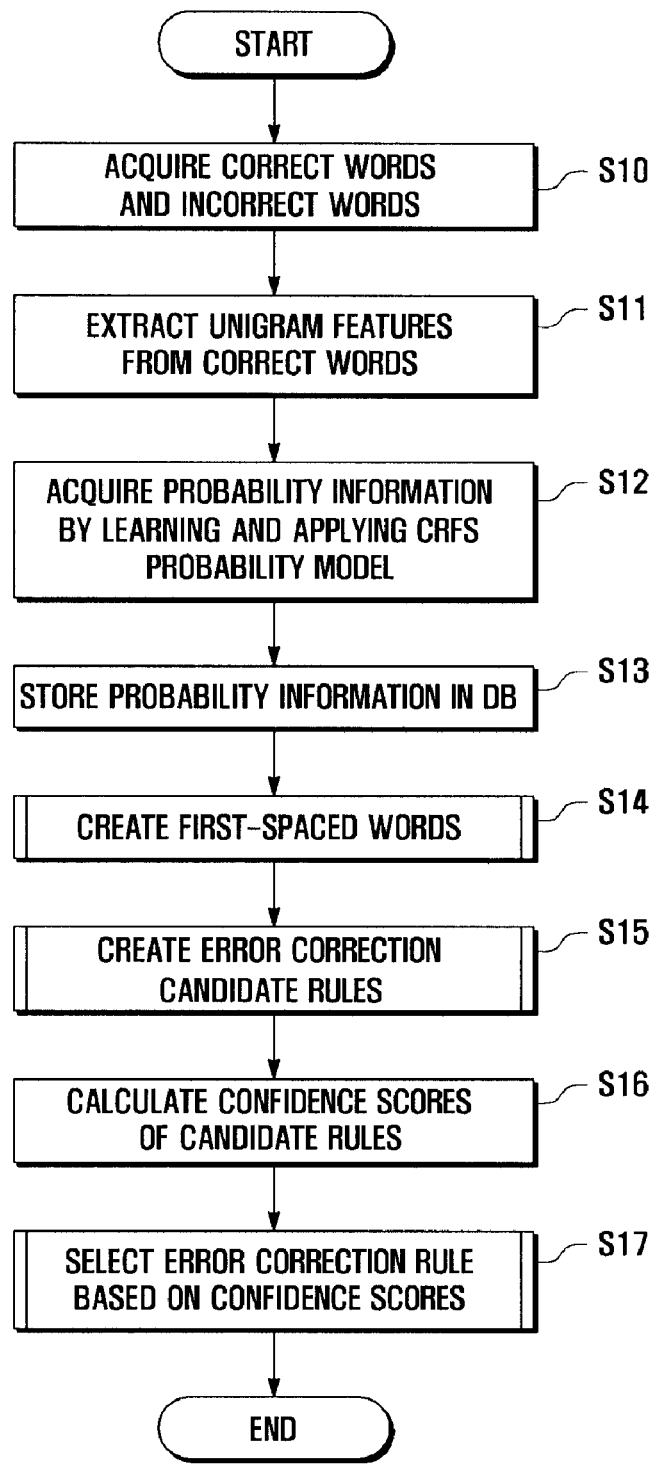
FIG. 3 is a flow diagram illustrating a learning process in a word-spacing correction method in accordance with an exemplary embodiment of the present invention.

FIG. 3 is a flow diagram illustrating an exemplary operation of a learning process in a word-spacing correction method in accordance with an exemplary embodiment of the present invention.

Referring now to FIGS. 1 to 3, the learning unit 120 acquires data for learning (S10). Here, data for learning includes a corpus of correct words M1 and a corpus of incorrect words M2. This acquiring step may be executed through a user's input.

Next, features are extracted from a corpus of correct words M1 (S11). As discussed above, the extraction of features may use a unigram model to reduce memory usage, and thus require a reduced memory capacity as compared to the conventional art.

Figures 4A, 4B:
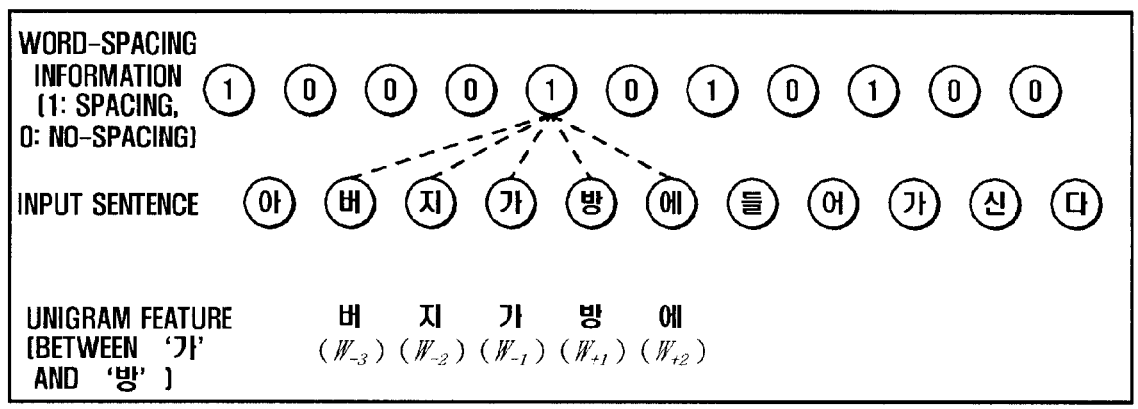
FIG. 4A is a view illustrating a process of extracting features in accordance with an exemplary embodiment of the present invention.
FIG. 4B is a view illustrating a set of features in accordance with an exemplary embodiment of the present invention.

FIG. 4A is a view illustrating an exemplary process of extracting features in accordance with an exemplary embodiment of the present invention. Referring now to FIG. 4A, the probability information generator 122 extracts a feature of five syllables which are composed of three front syllables and two rear syllables of a specific point between adjacent syllables. In FIG. 4A, an example of an input sentence '아버지가방에들어가신다' (this Korean language sentence ambiguously means 'A father enters a room' and sounds 'a-beo-ji-ga-bang-e-deu-reo-ga-sin-da') is given. Here, let's suppose a feature is extracted from a point between two syllables '가' and '방'. So, three front syllables are '버지가' and two rear syllables are '방에'. Accordingly, with regard to a point between two syllables '가' and '방', the probability information generator 122 extracts a unigram feature '버지가방에 $(W_{-3}W_{-2}W_{-1}W_{+1}W_{+2})$'. Similarly, from another point between two syllables '에' and '들', a unigram feature '가방에들어' is extracted.

FIG. 4B is a view illustrating a set of features in accordance with another exemplary embodiment of the present invention. As shown in FIG. 4B, features extracted as discussed above are recorded in a feature field. Additionally, a word-spacing information field records word-spacing information about each feature. Word-spacing information indicates whether to space words at a point between the third and fourth syllables. In word-spacing information, a number '1' means that words are spaced, and a number '0' means that words are not spaced.

For example, if a sentence '아버지가 방에 들어가신다' (this Korean language sentence exactly means 'A father enters a room') is found in a corpus of correct words M1, a space should be inserted between three syllables '버지가' and two syllables '방에'. Therefore, a number '1' is recorded as a word-spacing information about a feature '버지가방에'. On the other hand, no space is inserted between '지가방' and '에들'. So, a number '0' is recorded as a word-spacing information about a feature '지가방에들'.

Instead of using a unigram model, a 2-gram model or a 3-gram model may be alternatively used for extracting features. In these alternatives, features are extracted in the form of '$W_{-3}W_{-2}W_{-2}W_{-1}W_{-1}W_{+1}W_{+1}W_{+2}$' or '$W_{-3}W_{-2}W_{-1}W_{-2}W_{-1}W_{+1}W_{-1}W_{+1}W_{+2}$'. That is, these alternatives need several features at each point, so a use of a memory capacity is unfavorably increased. Therefore, the present invention uses preferably a unigram model for the extraction of features.

On the other hand, the present invention generalizes special characters to reduce a model size and to enhance performance. The following is a related description of such generalization of special characters.

FIG. 5 is a view illustrating a process of generalizing special characters in accordance with an exemplary embodiment of the present invention. An example shown in FIG. 5 uses the Korean language as a main language of a corpus of correct words M1.

Special characters include, for example, symbols except punctuation marks (i.e., ", ', ?, !, etc.), numbers, and other languages except a main language. In this embodiment, numbers, English characters and symbols are denoted by 'NU', 'EN' and 'SY', respectively.

If there are numbers or other languages in a sentence, such special characters are spaced in general regardless of their kinds. So, generalization of special characters may improve the efficiency of word-spacing.

For example, an input sentence '그는 19C Berlino 에서' (This sentence means 'He ... at Berlin in the 19$^{th}$ century') is given. Here, since a string '19C Berlin' is composed of numbers and English characters, an input sentence is generalized as '그는   NU EN 에서'. Therefore, a feature at a point between 'Berlin' and '에' can be extracted from a simpler five syllables '는   NU EN에 서'.

Returning now to FIGS. 1 and 3, after the above-discussed step S11 of extracting features, the probability information generator 122 acquires probability information by learning and applying a CRFs probability model (S12).

As discussed above, a CRFs probability model is an undirected graphical model to calculate a conditional probability of a specified output node when a variety of input nodes are given, and follows the form of a first-order Markov model when output nodes are linked to each other in the form of a linear chain. By using features extracted in step S11 and a corpus of correct words M1, the probability information generator 122 learns a CRFs probability model, as shown in Equation 1, for each point of word-spacing. This step calculates, through probability, the correlation between each point of figures and spacing or no-spacing. That is, this step is for calculating a probability of word-spacing at each point of figures.

$$P_{CRF}(S_{1,m} | F_{1,m}) = \frac{1}{Z(F)} \exp\left(\sum_{i=1}^{m} \sum_{k} \lambda_k f_k(S_{i-1}, S_i^k, F_i, t)\right)$$ [Equation 1]

In Equation 1, a denotation $S_{l,m}$ means word-spacing information about a sentence composed of m+1 syllables and may have a value 1 for spacing or a value 0 for no-spacing. A denotation $F_{l,m}$ means a unigram feature at a specific point for determining $S_{l,m}$. A denotation $f_k(S_{i-1}, S_i^k, F_i, t)$ is a feature function for automatic word-spacing and may have a value 1 in case of the appearance of a feature or a value 0 otherwise. Since an exemplary embodiment has three front syllables and two rear syllables, four values of a feature function are substituted in Equation 1 (namely, k=1~4) at each point, and thereby the correlation between each point and figures is calculated through probability. A denotation Z(F) is a normalized element. And a denotation $\lambda_k$ is a weight parameter assigned to each feature function. Such a weight parameter may be predefined by a user.

The probability information generator 122 acquires probability information of each feature by learning a CRFs probability model. Here, probability information includes, for example, a spacing probability (i.e., P(1|F)) that a specific point is spaced and a no-spacing probability (i.e., P(0|F)) that a specific point is not spaced.

Next, the probability information generator 122 stores probability information in the probability information database 132 (S13).

Then, the error correction rule generator 124 creates a corpus of first-spaced words by applying probability information to a corpus of incorrect words M2 (S14).

Figure 6:
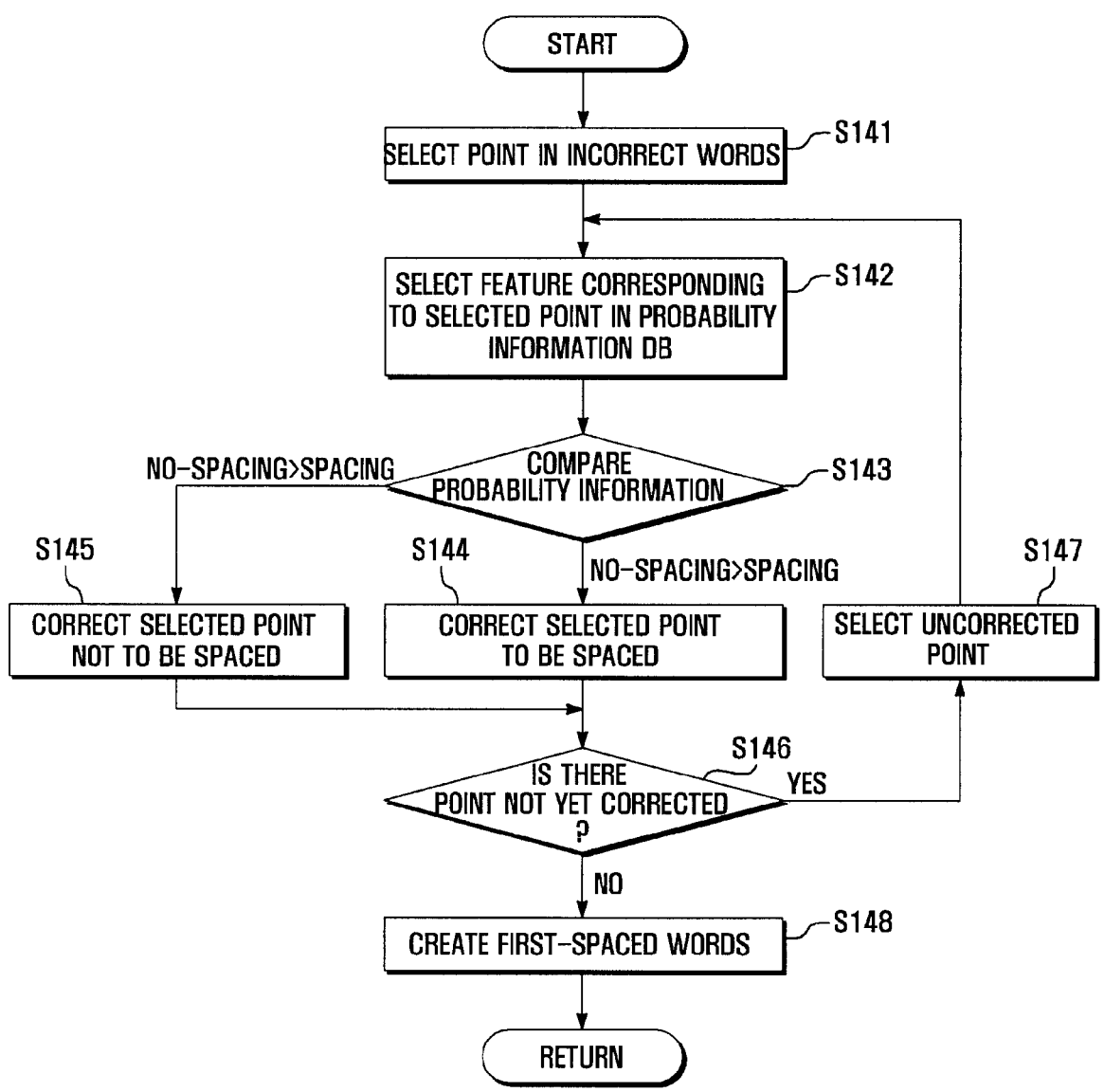
FIG. 6 is a flow diagram illustrating a process of creating a corpus of first-spaced words in accordance with an exemplary embodiment of the present invention.

FIG. 6 is a flow diagram illustrating an exemplary process of creating a corpus of first-spaced words in accordance with an exemplary embodiment of the present invention. Referring to FIG. 6 as well, the error correction rule generator 124 selects one point (namely, the first point) in a corpus of incorrect words M2 without a space between words (S141). Then, the error correction rule generator 124 selects a feature corresponding to the selected point in the probability information database 132 (S142).

Next, the error correction rule generator 124 compares probability information about the selected feature (S143). That is, the error correction rule generator 124 compares a spacing probability (i.e., P(1|F)) that the selected point is spaced with a no-spacing probability (i.e., P(0|F)) that the selected point is not spaced.

If a spacing probability P(1|F) is greater, the error correction rule generator 124 corrects the selected point to be spaced (S144). If a no-spacing probability P(0|F) is greater, the error correction rule generator 124 corrects the selected point so as not to be spaced (S145).

Next, the error correction rule generator 124 checks whether there is a point not yet corrected (S146). If there is any point required for correction, the error correction rule generator 124 selects that point (S147) and executes again steps S142 to S146.

If there are more no points to be corrected, the error correction rule generator 124 creates a corpus of first-spaced words by accepting a corpus of the corrected words (S148).

Returning now to FIG. 3, after the creation of a corpus of first-spaced words in step S14, the error correction rule generator 124 creates an error correction rule by using a corpus of first-spaced words.

An error correction rule is used, for example, to complete a resultant outcome to which a probability model is applied. In an exemplary embodiment of the invention, an error correction rule is extracted as n-gram of 2 or more size. A process of creating an error correction rule starts with step S15 of creating candidate rules.

Figure 7:
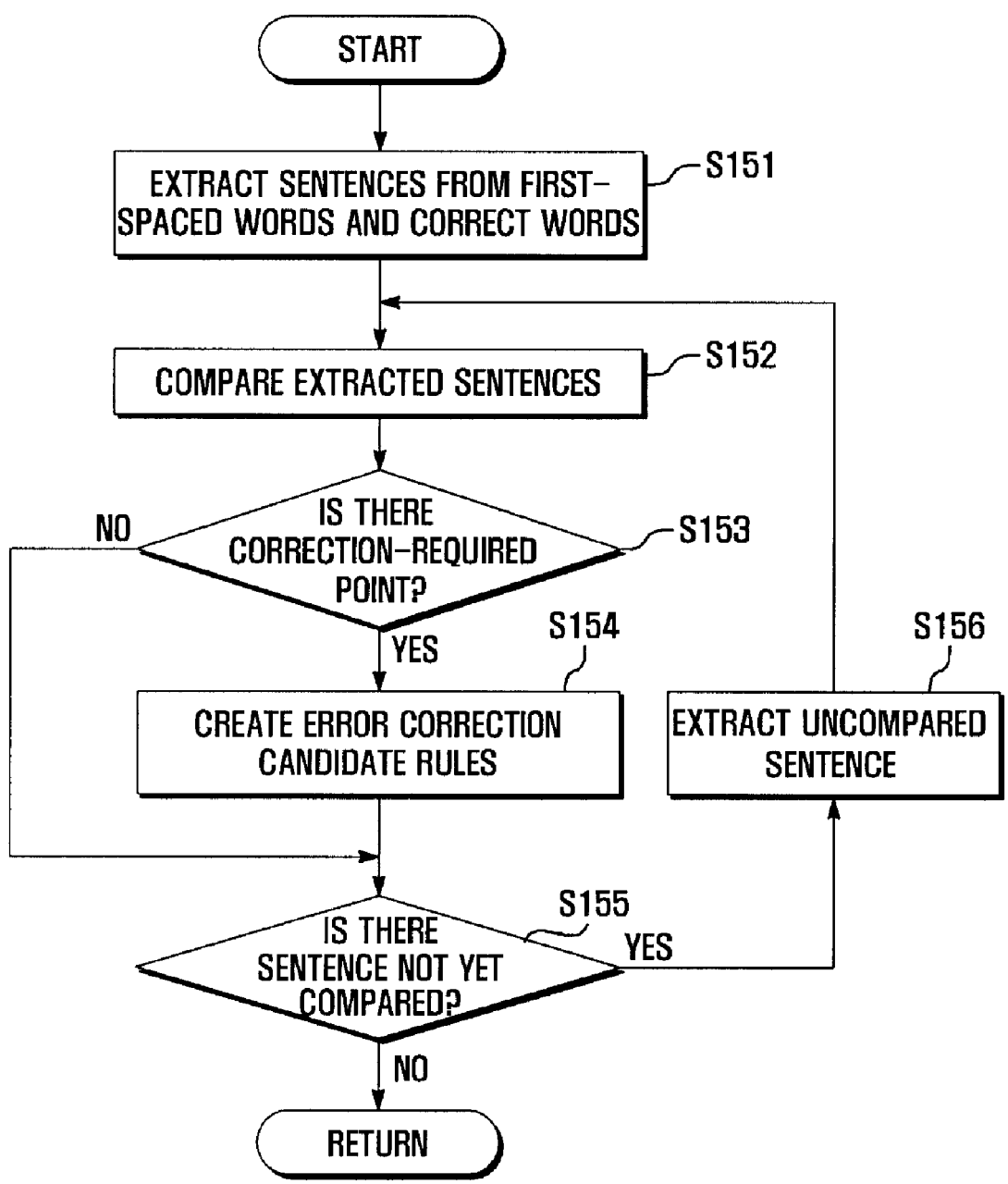
FIG. 7 is a flow diagram illustrating a process of creating error correction candidate rules in accordance with an exemplary embodiment of the present invention.

FIG. 7 is a flow diagram illustrating an exemplary process of creating error correction candidate rules in accordance with an exemplary embodiment of the present invention.

Referring now to FIG. 7, the error correction rule generator 124 first extracts sentences from a corpus of first-spaced words and from a corpus of correct words M1 (S151). Then, the error correction rule generator 124 compares the extracted sentences with each other (S152).

If a disagreeing part is found in a corpus of first-spaced words on the basis of a corpus of correct words M1 (S153), the error correction rule generator 124 specifies a disagreeing part as a correction-required point, namely, a point where a space should be inserted or deleted.

Next, the error correction rule generator 124 creates error correction candidate rules of n-gram of 2 or more size from a correction-required point (S154). Specifically, the error correction rule generator 124 extracts four rule patterns such as '$W_{-1}W_{+1}{\rightarrow}1/0$', '$W_{-2}W_{-1}W_{+1}{\rightarrow}1/0$', '$W_{-2}W_{-1}W_{+1}W_{+2}{\rightarrow}1/0$' and '$W_{-3}W_{-2}W_{-1}W_{+1}W_{+2}{\rightarrow}1/0$'. Here, a denotation '$W_{+n/-n}$' indicates a syllable having a relative distance of n from a correction-required point, and '1/0' means a value 1 or 0 of word-spacing information as discussed above.

For example, a corpus of incorrect words M2 '매우더운여름날농부는밭을맸다' (This Korean sentence ambiguously means 'A plowman cultivates the soil on a very hot summer day' and sounds 'mae-u-deo-un-yeo-reum-nal-nong-bu-neun-ba-teul-me-tta') is given. Additionally, a corpus of first-spaced words is '매우 더운여름날농 부는밭을 맸다' and a corpus of correct words is '매우 더운여름날 농부는밭을 맸다'.

A word-spacing is needed between syllables '날' and '농', so the error correction rule generator 124 specifies a point between '날' and '농' as a correction-required point. Then, the error correction rule generator 124 creates error correction candidate rules such as '날농 ($W_{-1}W_{+1}$)→1', '름날농 ($W_{-2}W_{-1}W_{+1}$)→1', '름날농부 ($W_{-2}W_{-1}W_{+1}W_{+2}$)→1' and '여름날농부 ($W_{-3}W_{-2}W_{-1}W_{+1}W_{+2}$)→1'.

On the other hand, a space between syllables '농' and '부' should be removed. So the error correction rule generator 124 further specifies that point as a correction-required point, and creates error correction candidate rules such as '농부 ($W_{-1}W_{+1}$)→0', '날농부 ($W_{-2}W_{-1}W_{+1}$)→0', '날농부는 ($W_{-2}W_{-1}W_{+1}W_{+2}$)→0' and '름날농부는 ($W_{-3}W_{-2}W_{-1}W_{+1}W_{+2}$)→0'.

Although this exemplary embodiment uses four rule patterns '$W_{-1}W_{+1}$', '$W_{-2}W_{-1}W_{+1}$', '$W_{-2}W_{-1}W_{+1}W_{+2}$' and '$W_{-3}W_{-2}W_{-1}W_{+1}W_{+2}$' to create error correction candidate rules, these rule patterns are exemplary only not to be considered as a limitation of the present invention. Other rule patterns with different numbers of syllables and different formats may be alternatively employed for error correction candidate rules. However, since many candidate rules may cause a load of computing power and may increase a use of a memory capacity, it is desirable that rule patterns are suitably defined according to capabilities of hardware and software.

Thus, the error correction rule generator 124 temporarily stores error correction candidate rules in the memory unit 130 or in its own buffer.

The above-discussed steps S152 to S154 are executed for the entire sentences extracted in the previous step S151.

Next, the error correction rule generator 124 checks whether there is a sentence not yet compared (S155). If there is any sentence required for comparison, the error correction rule generator 124 extracts that sentence (S156) and executes again steps S152 to S155.

If there is no sentence any more to be compared, the error correction rule generator 124 ends a process of creating candidate rules and goes to step S16 shown in FIG. 3.

On the other hand, although in this exemplary embodiment sentences are extracted from a corpus of first-spaced words and from a corpus of correct words and also compared with each other, the present invention is not limited to this exemplary embodiment. Alternatively, paragraphs or words may be used as units for extraction and comparison, and the entire corpus of words is used for comparison.

Returning to FIG. 3, after error correction candidate rules are created, the error correction rule generator 124 calculates a confidence score of each candidate rule (S16).

The following Equations 2 and 3 are used for the calculation of a confidence score.

$$\text{Score (Rule)} = \frac{\text{Positive(Rule)}}{\text{Positive(Rule)} + \text{Negative(Rule)}} \times \log_2(\text{Positive(Rule)} + 1) \quad \text{[Equation 2]}$$

$$\text{Confidence Score} = \frac{\text{Score (Rule)}}{\text{Max\_Score}} \quad \text{[Equation 3]}$$

In Equation 2, a term 'Positive(Rule)' means the number of word-spacing points that are properly corrected by applying a candidate rule to a corpus of incorrect words M2, and a term 'Negative(Rule)' means the number of word-spacing points that are improperly corrected by applying a candidate rule to a corpus of incorrect words M2.

In Equation 3, a term 'Max_Score' means the greatest score among confidence scores of candidate rules.

After confidence scores of all candidate rules are calculated in step S16, the error correction rule generator 124 selects an error correction rule, to be actually used, based on confidence scores (S17).

Figure 8:
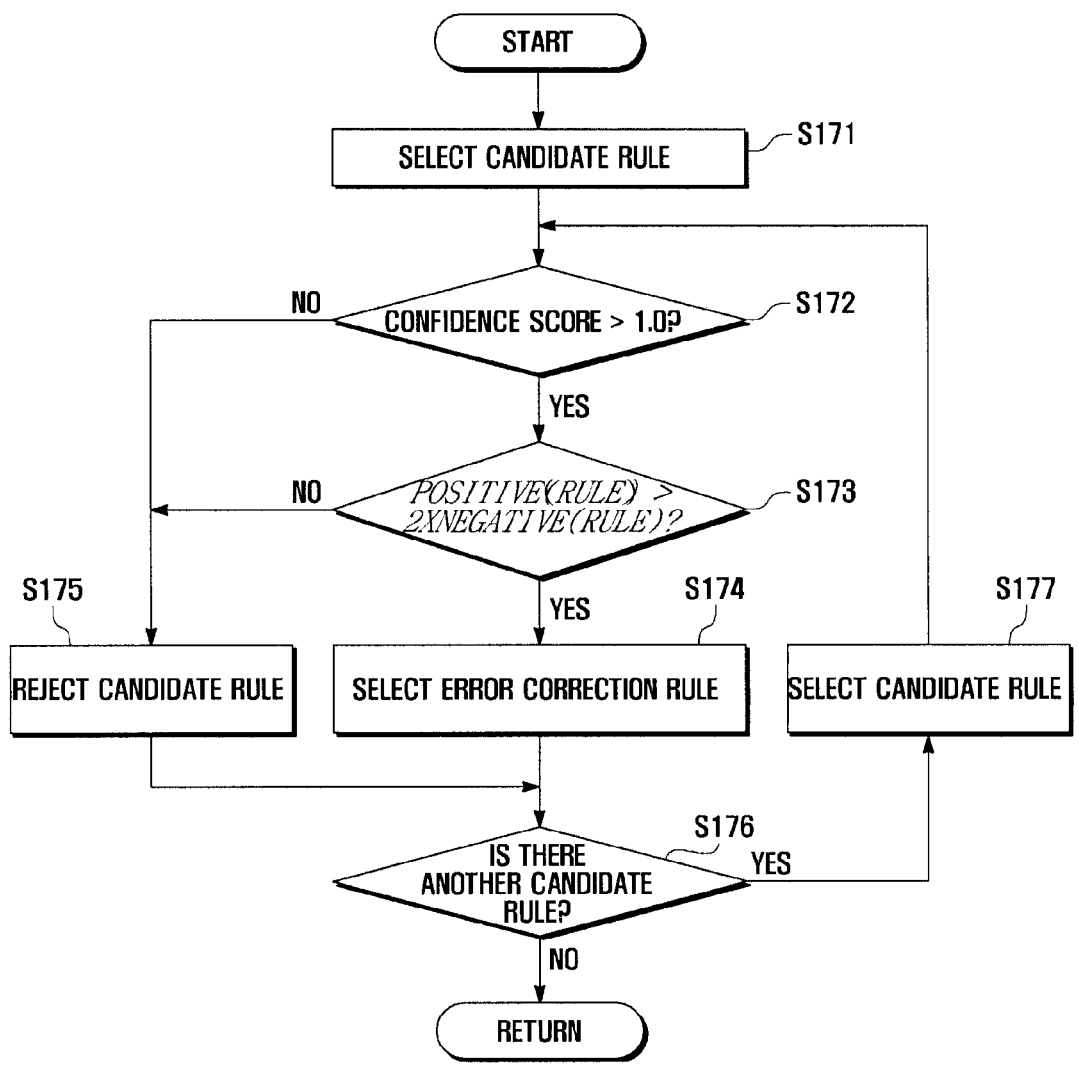
FIG. 8 is a flow diagram illustrating a process of selecting an error correction rule in accordance with an exemplary embodiment of the present invention.

FIG. 8 is a flow diagram illustrating an exemplary process of selecting an error correction rule in accordance with an exemplary embodiment of the present invention.

Referring now to FIG. 8, the error correction rule generator 124 first provisionally selects one of candidate rules (S171), and determines whether a confidence score of the selected candidate rule is greater than a value '1.0' (S172).

If a confidence score is greater than 1.0, the error correction rule generator 124 further determines whether or not the 'Positive(Rule)' of the selected candidate rule is greater than double 'Negative(Rule)' (S173). If the 'Positive (Rule)' is greater, the error correction rule generator 124 adopts the selected candidate rule as an error correction rule (S174). This error correction rule is stored in the error correction rule database 134.

If a confidence score is not greater than 1.0 or if 'Positive (Rule)' of the selected candidate rule is not greater than double 'Negative(Rule)', the error correction rule generator 124 rejects the selected candidate rule (S175).

As discussed above, the error correction rule generator 124 in this exemplary embodiment selects, for an error correction rule, candidate rules each of which has a confidence score being greater than 1.0 and 'Positive(Rule)' being greater than double 'Negative(Rule)'. Therefore, only a smaller number of candidate rules are adopted as an error correction rule, and it is possible to reduce a use of a memory capacity. However, the above-yardstick for adopting candidate rules is only an example of one way to implement the claimed invention, and a person of ordinary skill in the art is to understand there can be many changes or modifications that are within the spirit of the invention and the scope of the appended claims.

Next, the error correction rule generator 124 checks whether or not there is another candidate rule (S176). If yes, the error correction rule generator 124 selects that candidate rule (S177) and executes again steps S172 to S176.

If there is no candidate rule, the error correction rule generator 124 ends the process of selecting an error correction rule.

The learning process fully discussed herein above may be repeated several times to obtain more reliable probability information and error correction rules regarding more various features.

Next, the applying process in the word-spacing correction method will be described herein below.

Figure 9:
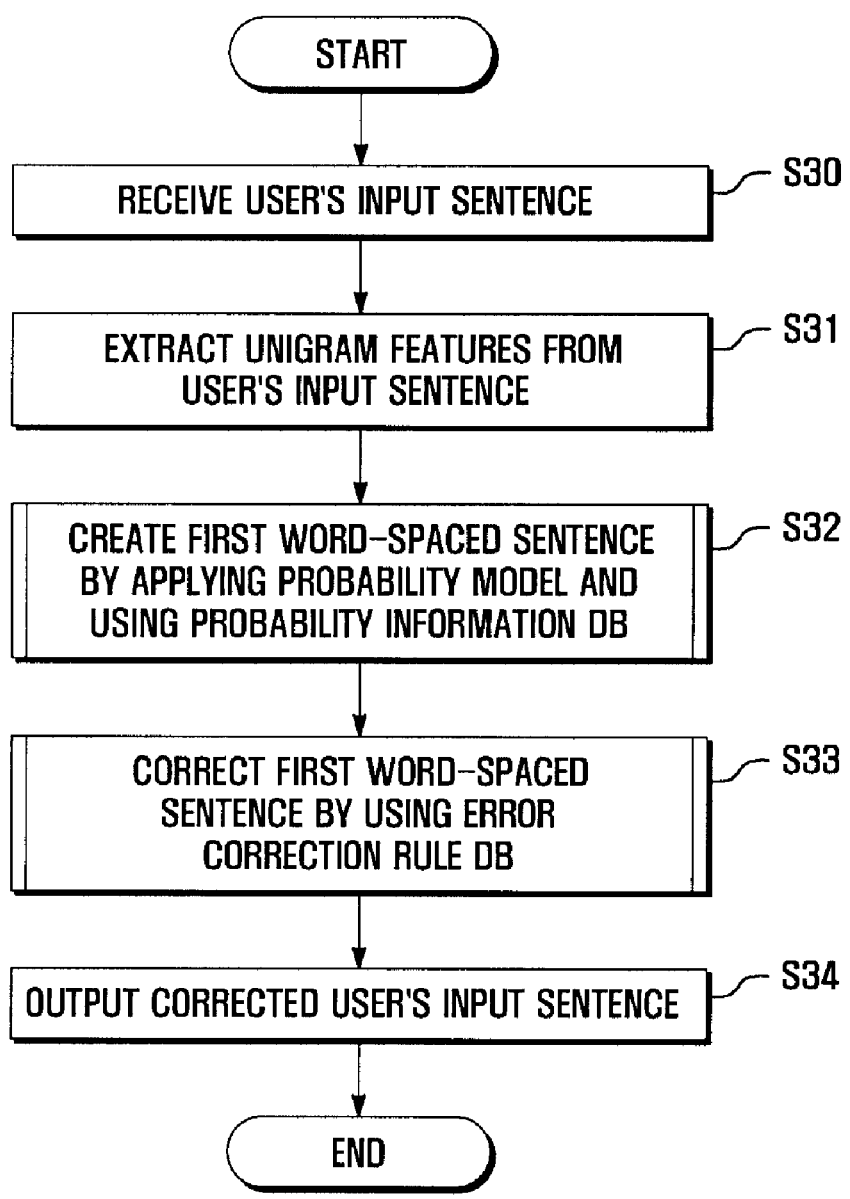
FIG. 9 is a flow diagram illustrating an applying process in a word-spacing correction method in accordance with an exemplary embodiment of the present invention.

FIG. 9 is a flow diagram illustrating an exemplary application process in a word-spacing correction method in accordance with an exemplary embodiment of the present invention.

Referring now to FIGS. 1, 2A, 2B and 9, the applying unit 140 receives a user's input sentence M3 through the input unit 150 (S30).

Then, the first applying module 142 of the applying unit 140 extracts unigram features from a user's input sentence M3 (S31). This step S31 is similar to the aforesaid step S11 in the learning process except that a target for extraction is not a corpus of correct words M1 but a user's input sentence M3. That is, the first applying module 142 extracts, from a user's input sentence M3, a feature of five syllables which are composed of three front syllables and two rear syllables of a specific point between adjacent syllables.

For example, let's suppose a sentence '아버지가방' (this Korean sentence may mean 'A father . . . a room' or 'a father's bag' and sounds 'a-beo-ji-ga-bang') is inputted by a user. In this example, the first applying module 142 extracts four features such as '^^아버지', '^아버지가', '아버지가방' and '버지가방$'. In these features, a symbol '^' means absence of a syllable before the front syllable '아', and a symbol '$' means absence of a syllable after the rear syllable '방'.

After features are extracted for all the points of a user's input sentence M3, the first applying module 142 applies a probability model to each feature (S32).

Figure 10:
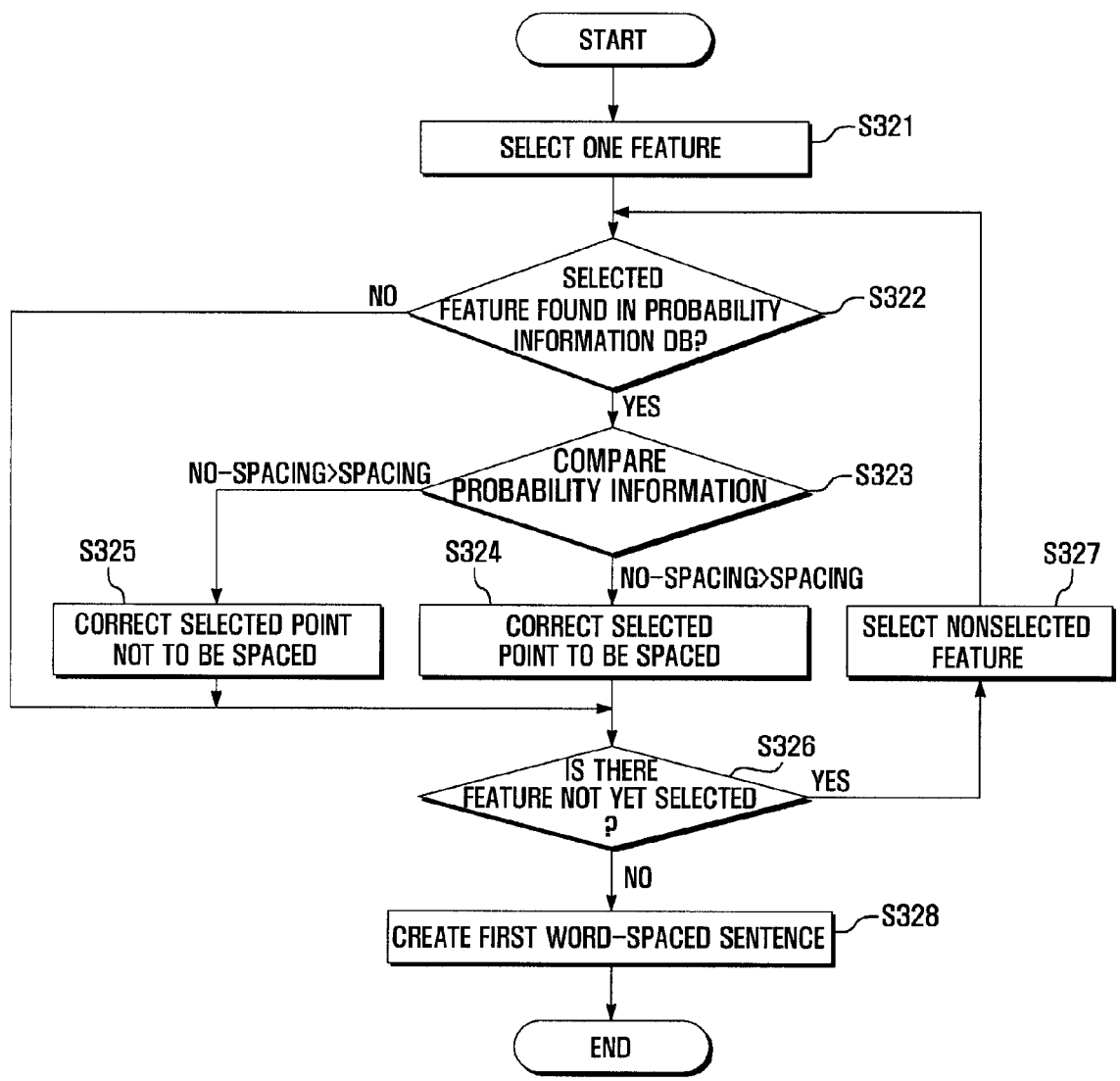
FIG. 10 is a flow diagram illustrating a process of applying a probability model in accordance with an exemplary embodiment of the present invention.

FIG. 10 is a flow diagram illustrating exemplary operation of applying a probability model in accordance with an exemplary embodiment of the present invention. Referring now to FIG. 10, the first applying module 142 selects one of the extracted features (S321).

Then, the first applying module 142 determines whether the selected feature is found in the feature field of the probability information database 132 (S322). If the selected feature is not found, the first applying module 142 goes to step S326 to be described later.

If the selected feature is found in the probability information database 132, the first applying module 142 compares probability information about the selected feature (S323). If a spacing probability P(1|F) is greater than a no-spacing probability P(0|F), the first applying module 142 corrects a point, corresponding to the selected feature, to be spaced (S324). If a no-spacing probability P(0|F) is greater than a spacing probability P(1|F), the first applying module 142 corrects that point to be not spaced (S325).

Next, the first applying module 142 checks whether there is a feature not selected (S326). If any feature remains not selected, the first applying module 142 selects that feature (S327) and executes again steps S322 to S326.

If there is no more features to be selected, the first applying module 142 creates a first word-spaced sentence by accepting a corrected sentence (S328).

For example, let's suppose the above-discussed sentence '아버지가방' is inputted. In this example, the first applying module 142 obtains probability information about four features '^^아버지', '^아버지가', '아버지가방' and '버지가방$' from the probability information database 132.

Then, the first applying module 142 executes spacing or no-spacing for a point by comparing a spacing probability P(1|F) with a no-spacing probability P(0|F) in each feature.

FIG. 2A exemplarily shows a probability value of each feature. As discussed above, a probability value indicates probability that a point between the third and fourth syllables in a feature is spaced or not spaced. In an example of FIG. 2A, two features '^^아버지' and '^아버지가' have relatively greater no-spacing probabilities, whereas the other features '아버지가방' and '버지가방$' have relatively greater spacing probabilities. Therefore, a first word-spaced sentence '아버지 가 방' is created.

Returning now to FIG. 9, after the first applying module 142 creates a first word-spaced sentence by applying a probability model in step S32, a first word-spaced sentence is corrected by using the error correction rule database 134 (S33).

Figure 11:
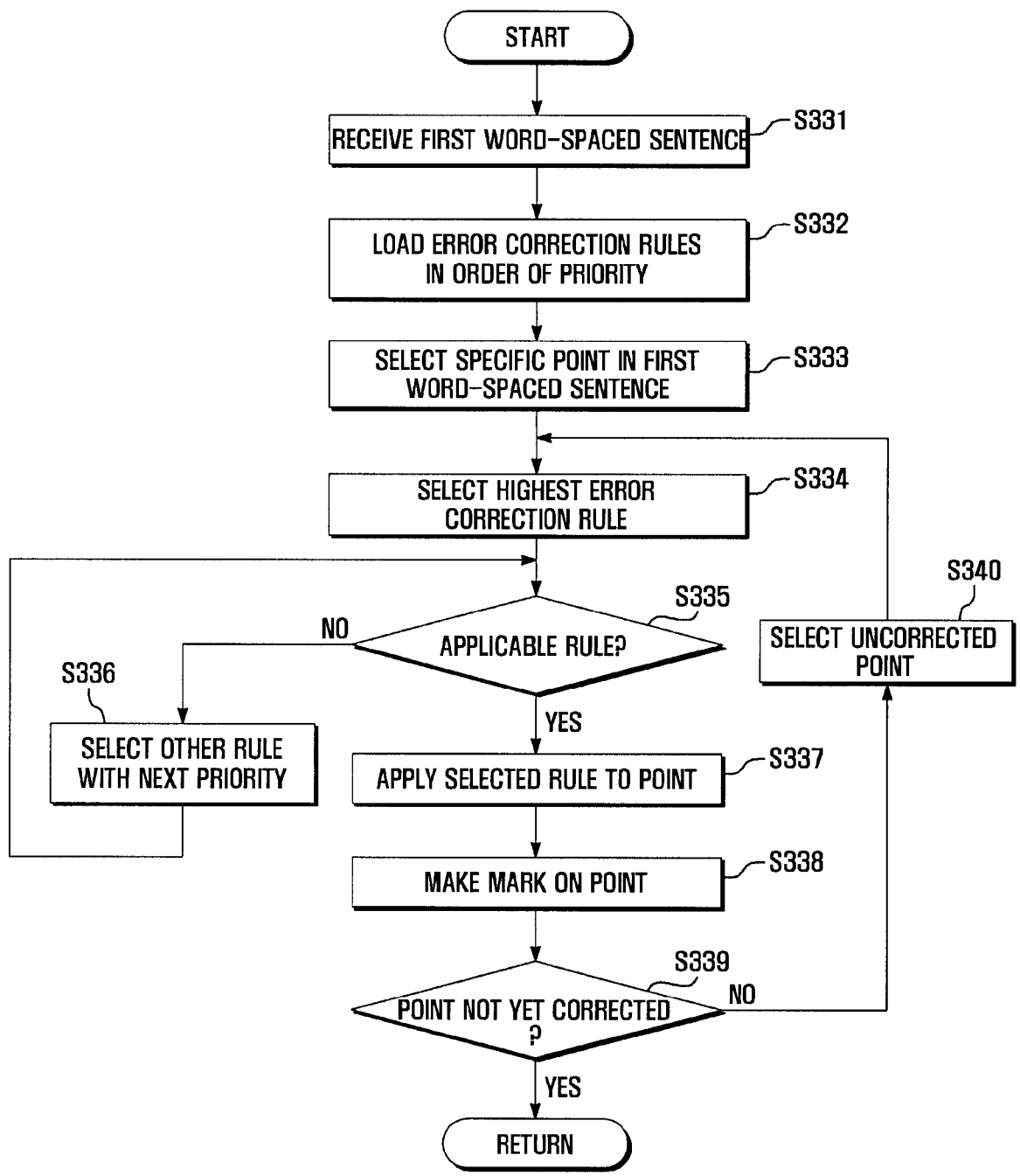
FIG. 11 is a flow diagram illustrating a process of applying an error correction rule in accordance with an exemplary embodiment of the present invention.

FIG. 11 is a flow diagram illustrating exemplary operation of applying an error correction rule in accordance with an exemplary embodiment of the present invention. Referring now to FIG. 11, the second applying module 144 receives a first word-spaced sentence from the first applying module 142 (S331). Then, the second applying module 144 loads error correction rules registered in the error correction rule database 134 (S332). Specifically, the second applying module 144 assigns priorities to error correction rules according to their confidence scores and loads error correction rules in the order of priority. In case of FIG. 2B, a feature '버지가방' with the highest confidence score is loaded as the highest error correction rule.

Next, the second applying module 144 selects a specific point in a first word-spaced sentence (S333). Here, a specific point being selected means a point to which an error correction rule will be applied. This point is selected one by one from the first to the last among points between adjacent syllables in a first word-spaced sentence. For example, if a first word-spaced sentence '아버지 가 방' is inputted, the first selected point is a point between syllables '아' and '버'.

After one point is selected, the second applying module 144 selects the highest error correction rule (S334). As discussed above, in case of FIG. 2B, a feature '버지가방' with the highest confidence score is loaded as the highest error correction rule. So, the second applying module 144 selects a feature '버지가방' as the highest error correction rule.

Next, the second applying module 144 determines whether the selected error correction rule is applicable to the selected point (S335). In the above case where '아버지 가 방' is inputted as a first word-spaced sentence and where '버지가방' is selected as the highest error correction rule, this selected error correction rule is applicable to, for example, a point between '지' and '가' but not applicable to a point between '아' and '버'.

If any of the selected rules is inapplicable, the second applying module 144 selects another error correction rule with the next highest priority (S336). In case of FIG. 2B, the second applying module 144 selects '아버지가방' as the next error correction rule.

These steps S335 and S336 are repeated until an error correction rule applicable to the selected point is found. On the other hand, although not illustrated, if there are no more applicable rules, the second applying module 144 performs step S339 to be described later.

Referring again to FIG. 2B, if the selected point is between '아' and '버', only an error correction rule '^^아버지' with the fifth priority can be applicable to that point.

In this case, an error correction rule '^^아버지' is selected after steps S335 and S336 are repeated four times, and at the fifth entry into step S335 the second applying module 144 determines that the selected rule '^^아버지' is applicable to the selected point.

Next, the second applying module 144 applies the selected error correction rule to the selected point (S337). In the above case, the second applying module 144 corrects word-spacing of the selected point, depending on word-spacing information about '^^아버지'. In a case of FIG. 2B, word-spacing information about '^^아버지' is 0 that means no-spacing. So, the second applying module 144 applies no-spacing to the selected point.

Next, the second applying module 144 makes a mark on the selected point to which an error correction rule has been already applied (S338). This mark indicates that no rule will be applied to such a point any more.

Next, the second applying module 144 checks whether or not a first word-spaced sentence has a point not yet corrected (S339). If there is any point to be corrected, the second applying module 144 selects that point (S340) and executes again steps S334 to S339.

If a point between '버' and '지' is selected instead of the aforesaid point between '아' and '버', an error correction rule '^아버지가' is applied to that point. Since word-spacing information about '^아버지가' is 0 as shown in FIG. 2B, a point between '버' and '지' is not spaced.

If a point between '지' and '가' is selected, applicable rules are '아버지가방' and '버지가방'. However, since '버지가방' has a relatively higher confidence score, '버지가방' is applied as an error correction rule. Word-spacing information about '버지가방' is 1 as shown in FIG. 2B, so a point between '지' and '가' is spaced. Therefore, a first word-spaced sentence remains '아버지 가 방'.

If a point between '가' and '방' is selected, applicable rules are '지가방' and '가방'. However, since '지가방' is relatively greater in confidence score, '지가방' is applied as an error correction rule. Word-spacing information about '지가방' is 0 as shown in FIG. 2B, so a point between '가' and '방' is not spaced. Therefore, a first word-spaced sentence is finally corrected to '아버지 가방', which may be referred to as a second word-spaced sentence or a completely corrected user's input sentence.

Through the aforesaid steps, the second applying module 144 corrects a first word-spaced sentence.

Then returning to FIG. 9, the second applying module 144 outputs a completely corrected user's input sentence through the output unit 160 (S34).

Therefore, a user can see a corrected sentence from which improper spaces between words are automatically removed.

As discussed in detail heretofore, the present invention makes it possible to automatically correct word-spacing in a sentence through a hybrid technique that employs both unigram probability information and error correction rules. The present invention can be practiced by mobile devices having relatively lower computing power in comparison with conventional approaches suitable for personal computers having higher computing power. Additionally, the present invention lays the groundwork for development of natural language interface suitable for mobile devices.

Although the above-described exemplary embodiment is focused on the Korean language, the word-spacing correction system and method of the present invention does not rely on specific languages and can be easily applied to any other languages without a heavy burden. In case of English, the present invention may be available by replacing Korean syllables with English alphabets. That is, a word-spacing correction for English may use, as features, three front alphabets and two rear alphabets of a specific point between adjacent alphabets. Additionally, since a single English alphabet has a smaller quantity of information than a single Korean syllable, four or five front alphabets and three or four rear alphabets may be also used as feature.

On the other hand, the present invention may not be limited to mobile devices can be practiced, for example, with virtually electronic devices that permits word input.

While this invention has been particularly shown and described with reference to an exemplary embodiment thereof, it will be understood by those skilled in the art that various changes in form and details may be made therein without departing from the spirit and scope of the invention as defined by the appended claims. It also understood that the exemplary operations of the exemplary methods described herein are typically performed by the processor of an electronic device having relatively lower computer power, including but not limited in any way to pocket-sized and hand-held devices.

What is claimed is:

1. A word-spacing correction method for an electronic device comprising:
   (1) a learning process performed by a processor of the electronic device which includes:
   creating probability information about each feature from a corpus of correct words in a storage by extracting the features from the corpus of correct words from the storage and applying the extracted features and a probability model to the corpus of incorrect words, and
   creating error correction rules by applying the probability information to a corpus of incorrect words from which all spaces between words of the corpus of correct words are removed, including:
   creating a corpus of first-spaced words by applying the probability information and the probability model to the corpus of incorrect words,
   extracting correction-required points from the corpus of first-spaced words,
   creating error correction candidate rules from the correction-required points,
   calculating confidence scores of the error correction candidate rules by applying each error correction candidate rule to the corpus of incorrect words, and
   selecting the error correction rule based on the confidence scores;
   (2) an applying process performed by the processor of the electronic device which includes:
   correcting word-spacing in a user's input sentence by applying the probability information and the error correction rules to the user's input sentence,
   wherein the selecting of the error correction rule is performed in accordance with the following Equations:

$$\text{Score(Rule)} = \text{Positive(Rule)}/\text{Positive(Rule)} + \text{Negative(Rule)} \times \log_2(\text{Positive(Rule)} + 1)$$

$$\text{Confidence Score} = \text{Score(Rule)}/\text{Max\_Score}$$

wherein a term 'Positive(Rule)' comprises a number of word-spacing points that are properly corrected by applying the error correction candidate rule to the corpus of incorrect words,
   where a term 'Negative(Rule)' comprises a number of word-spacing points that are improperly corrected by applying the error correction candidate rule to the corpus of incorrect words, and
   where a term 'Max_Score' comprises a greatest score among the confidence scores of the error correction candidate rules.

2. The method of claim 1, wherein the extracting of the features uses a unigram model.

3. The method of claim 2, wherein the extracting of the features includes extracting a feature comprising five syllables in which are included three front syllables and two rear syllables of a specific point between adjacent syllables.

4. The method of claim 2, wherein the extracting of the features includes generalizing special characters which have symbols except punctuation marks, numbers, and other languages except a main language.

5. The method of claim 1, wherein the probability model comprises a Conditional Random Fields (CRFs) probability model.

6. The method of claim 5, wherein the CRFs probability model uses the following Equation:

$$P_{CRF}(S_{1,m} | F_{1,m}) = \frac{1}{Z(F)} \exp\left(\sum_{i=1}^{m} \sum_{k} \lambda_k f_k(S_{i-1}, S_i^k, F_i, t)\right),$$

where a denotation $S_{l,m}$ comprises word-spacing information about a sentence composed of m+1 syllables and has a value 1 for spacing or a value 0 for no-spacing,
where a denotation $F_{l,m}$ comprises a unigram feature at a specific point for determining $S_{l,m}$,
where a denotation $f_k(S_{i-1}, S_i^k, F_i, t)$ comprises a feature function for automatic word-spacing and has a value 1 in case of appearance of a feature or a value 0 otherwise,
where a denotation Z(F) comprises a normalized element, and
where a denotation $\lambda_k$ comprises a weight parameter assigned to each feature function.

7. The method of claim 1, wherein the creating of the error correction candidate rules includes creating the error correction candidate rules of n-grams of 2 or more in size.

8. The method of claim 1, wherein the selecting of the error correction rule includes selecting error correction candidate rules, each of which has the confidence score being greater than 1.0 and the 'Positive(Rule)' being greater than a double 'Negative(Rule)'.

9. The method of claim 1, wherein the applying process includes:
receiving the user's input sentence,
creating a first word-spaced sentence by applying the probability information to the user's input sentence, and
creating a second word-spaced sentence by applying the error correction rules to the first word-spaced sentence.

10. The method of claim 9, wherein the creating of the first word-spaced sentence includes:
extracting unigram features from the user's input sentence, and
determining whether or not to correct selected points in the user's input sentence on the basis of probability information about the extracted features.

11. The method of claim 9, wherein the creating of the second word-spaced sentence includes applying the error correction rule with a highest confidence score to selected points in the first word-spaced sentence.

12. A word-spacing correction system of an electronic device comprising:
a learning unit including processing means for creating probability information about each feature from a corpus of correct words, and for creating error correction rules by applying the probability information to a corpus of incorrect words from which all spaces between words of the corpus of correct words are removed,
wherein the learning unit includes
a probability information generator for extracting the features from the corpus of correct words, and applying the extracted features and a probability model to the corpus of incorrect word, and
an error correction rule generator for creating a corpus of first-spaced words by applying the probability information and the probability model to the corpus of incorrect words, for extracting correction-required points from the corpus of first-spaced words, for creating error correction candidate rules from the correction-required points, for calculating confidence scores of the error correction candidate rules, and for selecting the error correction rule based on the confidence scores; and
an applying unit including processing means for correcting word-spacing in a user's input sentence by applying the probability information and the error correction rules to the user's input sentence,
wherein the error correction rule generator selects the error correction rule in accordance with the following Equations:

Score(Rule)=Positive(Rule)/Positive(Rule)+Negative (Rule)×log$_2$(Positive(Rule)+1)

Confidence Score=Score(Rule)/Max_Score wherein a term 'Positive(Rule)' comprises a number of word-spacing points that are properly corrected by applying the error correction candidate rule to the corpus of incorrect words,
where a term 'Negative(Rule)' comprises a number of word-spacing points that are improperly corrected by applying the error correction candidate rule to the corpus of incorrect words, and
where a term 'Max_Score' comprises a greatest score among the confidence scores of the error correction candidate rules.

13. The system of claim 12, wherein the probability information generator uses a unigram model to extract the features.

14. The system of claim 12, wherein the probability model comprises a Conditional Random Fields (CRFs) probability model.

15. The system of claim 12, wherein the applying unit includes:
a first applying module for creating a first word-spaced sentence by applying the probability information to the user's input sentence, and
a second applying module for creating a second word-spaced sentence by applying the error correction rules to the first word-spaced sentence.

16. The system of claim 15, wherein the first applying module extracts unigram features from the user's input sentence, and determines whether or not to correct selected points in the user's input sentence on the basis of probability information about the extracted features.

17. The system of claim 15, wherein the second applying module applies the error correction rule with the highest confidence score to selected points in the first word-spaced sentence.

18. The system of claim 12, further comprising:
a memory unit for storing the probability information and the error correction rules.

* * * * *